United States Patent
Brown et al.

(10) Patent No.: US 7,870,607 B2
(45) Date of Patent: *Jan. 11, 2011

(54) SECURITY AND ANALYSIS SYSTEM

(75) Inventors: Wendy M. Brown, Raleigh, NC (US); Alexis H. Garvin, Chapel Hill, NC (US); Joseph R. Gonzalez, Durham, NC (US); James E. Hughes, Cary, NC (US); James L. Polak, Jr., Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/041,025

(22) Filed: Mar. 3, 2008

(65) Prior Publication Data

US 2008/0148413 A1 Jun. 19, 2008

Related U.S. Application Data

(63) Continuation of application No. 10/818,836, filed on Apr. 6, 2004, now Pat. No. 7,392,397.

(51) Int. Cl.
*G06F 21/22* (2006.01)
(52) U.S. Cl. ............. 726/21; 726/1; 726/4; 726/17
(58) Field of Classification Search ............ 713/168, 713/155, 182, 193
See application file for complete search history.

(56) References Cited

U.S. PATENT DOCUMENTS

| | | | |
|---|---|---|---|
| 5,694,595 A | 12/1997 | Jacobs et al. | |
| 5,748,890 A | 5/1998 | Goldberg et al. | |
| 5,765,153 A | 6/1998 | Benantar et al. | |
| 6,005,571 A | 12/1999 | Pachauri | |
| 6,513,111 B2 * | 1/2003 | Klimczak et al. | 713/1 |
| 2002/0069175 A1 | 6/2002 | Burich | |
| 2002/0107920 A1 | 8/2002 | Hotti | |
| 2002/0120482 A1 | 8/2002 | Anderson et al. | |
| 2002/0138758 A1 | 9/2002 | Cason et al. | |
| 2003/0126050 A1 | 7/2003 | Theiss et al. | |

* cited by examiner

*Primary Examiner*—Minh Dinh
(74) *Attorney, Agent, or Firm*—Schmeiser, Olsen & Watts; John R. Pivnichny

(57) ABSTRACT

A system for providing access to at least one specified application within a software system. The software system comprises security software and a software tool suite. The security software is adapted to authorize a user to access at least one specified application on a computer system comprising a security standard. The software tool suite is adapted to create or modify a user profile for the user. The user profile comprises at least one transaction necessary for the user to access the at least one specified application. The software tool suite is adapted to integrate in real time the user profile into the security software. The software tool suite is adapted to create a user profile report in real time to verify that the user profile is in compliance with the security standard of the computer system.

14 Claims, 4 Drawing Sheets

SECURITY AND ANALYSIS SYSTEM

This application is a continuation application claiming priority to Ser. No. 10/818,836, filed Apr. 6, 2004.

BACKGROUND OF THE INVENTION

1. Technical Field

The present invention relates to a system and associated method to authorize a user to access specified applications within a computer system.

2. Related Art

Providing a secure system to access specified files on a network typically requires a skilled person to modify a complicated access system. Requiring a skilled person to modify a complicated access system may be very time consuming and therefore costly. Therefore there exists a need for a system and associated method for providing access specified files on a network without requiring a skilled person.

SUMMARY OF THE INVENTION

The present invention provides software system, comprising:

security software adapted to authorize a user to access at least one specified application on a computer system comprising a security standard; and a software tool suite adapted to create or modify a user profile for the user, wherein the user profile comprises at least one transaction necessary for the user to access the at least one specified application, wherein the software tool suite is adapted to integrate in real time the user profile into the security software, and wherein the software tool suite is adapted to create a user profile report in real time to verify that the user profile is in compliance with the security standard of the computer system.

The present invention provides a method, comprising:

providing a software system comprising security software and a software tool suite;

creating or modifying by the software tool suite, a user profile for a user, wherein the user profile comprises at least one transaction necessary for the user to access the at least one specified application;

creating by the software tool suite, a user profile report in real time to verify that the user profile is in compliance with a security standard of a computer system comprising the software system;

integrating in real time by the software tool suite, the user profile into the security software;

authorizing by the security software, the user to access at least one specified application on the computer system based on the user profile.

The present invention provides a computer system comprising a processor and a computer readable memory unit coupled to the processor, said memory unit containing security software and a software tool suite that when executed by the processor implement a method comprising the computer implemented steps of:

creating or modifying by the software tool suite, a user profile for a user, wherein the user profile comprises at least one transaction necessary for the user to access the at least one specified application;

creating by the software tool suite, a user profile report in real time to verify that the user profile is in compliance with a security standard of a computer system comprising the software system;

integrating in real time by the software tool suite, the user profile into the security software;

authorizing by the security software, the user to access at least one specified application on the computer system based on the user profile.

The present invention provides a computer program product, comprising:

a computer usable medium having a computer readable program code embodied therein for implementing a method, wherein the computer readable program code comprises security software and a software tool suite adapted to implement the method by executing the steps of:

creating or modifying by the software tool suite, a user profile for a user, wherein the user profile comprises at least one transaction necessary for the user to access the at least one specified application;

creating by the software tool suite, a user profile report in real time to verify that the user profile is in compliance with a security standard of a computer system comprising the software system;

integrating in real time by the software tool suite, the user profile into the security software;

authorizing by the security software, the user to access at least one specified application on the computer system based on the user profile.

The present invention advantageously provides a structure and associated method for providing access specified files on a network without requiring a skilled person.

DETAILED DESCRIPTION OF THE INVENTION

Figure 1:
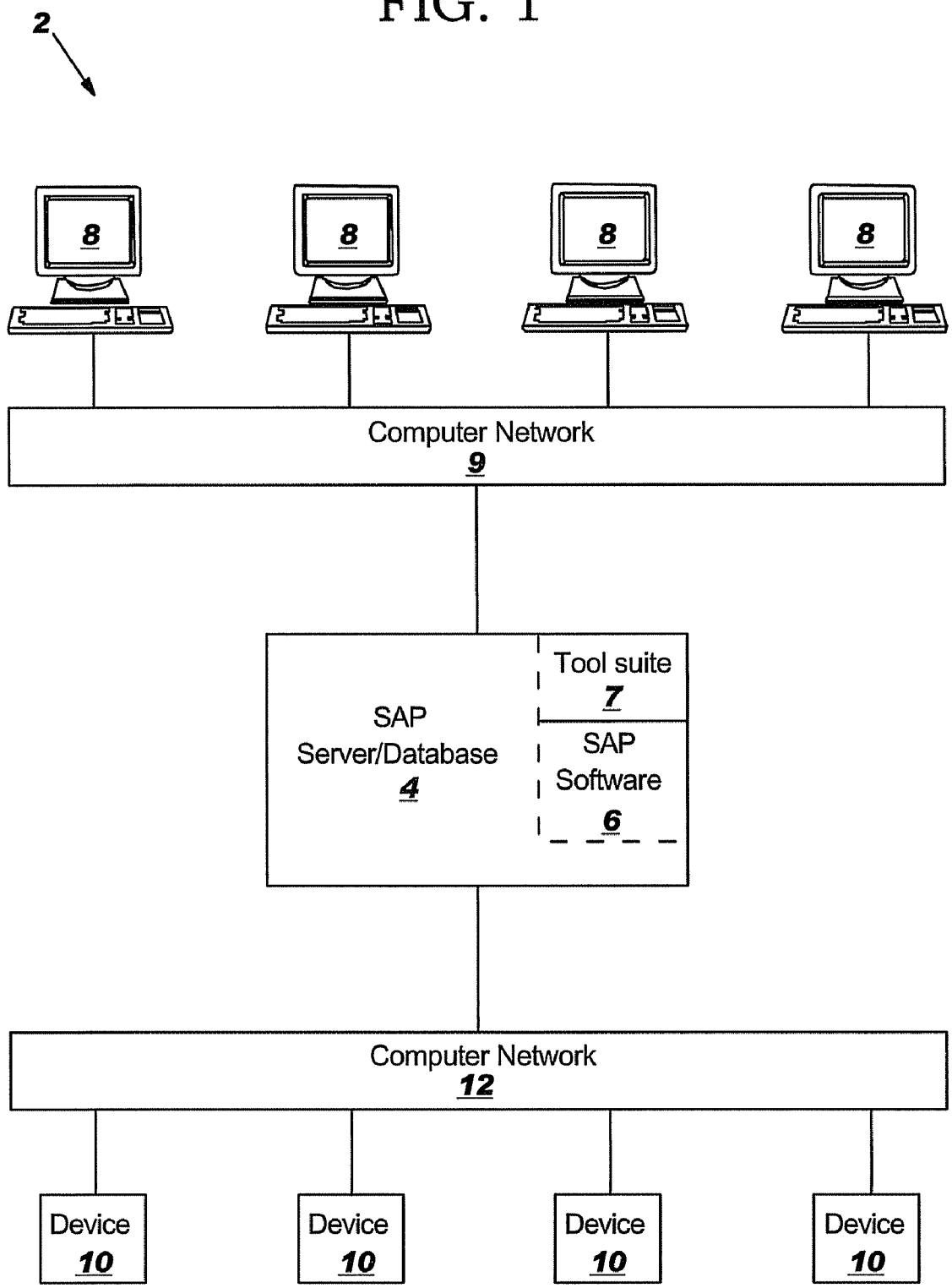
FIG. 1 illustrates a block diagram view of a system comprising a systems applications and products (SAP) server/database and a plurality of devices, in accordance with embodiments of the present invention.

FIG. 1 illustrates a block diagram view of a computer system 2 comprising a plurality of terminals 8, a computer network 9, a computer network 12, a systems applications and products (SAP) server/database 4, and a plurality of devices 10, in accordance with embodiments of the present invention. The plurality of terminals 8 are electrically connected through the computer network 9 to the systems applications and products (SAP) server/database 4. The SAP server/database 4 is electrically connected through the computer network 12 to the devices 10. The computer network 9 may be any computer network known to a person of ordinary skill in the art including, inter alia, the Internet, an intranet, a local area network (LAN), a wide area network (WAN), etc. The computer network 12 may be any computer network known to a person of ordinary skill in the art including, inter alia, the Internet, an intranet, a local area network (LAN), a wide area network (WAN), etc. The computer network 9 and the computer network 12 may be part of a same computer network (e.g., the computer network 9 and the computer network 12 part of the same LAN). Alternatively, the computer network 9 and the computer network 12 each may be part of a different computer network (e.g., computer network 9 is a LAN and computer network 12 is the Internet). Each of the devices 10 may be, inter alia, a memory device, a computer, etc. The memory device may be any memory device known to a person of ordinary skill in the art including, inter alia, a disc drive (e.g., hard disc drive, compact disc drive, digital video disc drive, etc), flash memory device, a magnetic tape storage device, etc. The computer system 2 may be used in a business environment to provide user access to various applications necessary for the user (e.g., employee of the business) to perform his/her job duties. The various applications may be located within the devices 10. Examples of applications that the user may require access to perform his/her job duties may include, inter alia, external data files (e.g., vendor catalogs for part orders, etc), internal data files (e.g., company orders, company customers, employee payroll, employee records, etc), computer programs (e.g., part order programs, payroll calculation programs, etc), etc. The SAP server/database 4 comprises SAP software 6 (produced by SAP America) adapted to provide a standard set of transaction codes with associated authorization codes (i.e., a standard set of transaction codes with associated authorization codes that typically come delivered with a SAP software package) to allow users to access specified applications based on his/her job role. A transaction is defined herein including in the claims as a task (e.g., unit of work) or function that is required for access to specified applications. A transaction code is an alpha numeric code that serves as a gateway to the associated transaction. An authorization is defined herein including in the claims as allowing access to the specified transactions. An authorization code is an alpha numeric code that serves as a gateway to the associated authorization. The job role may comprise a job title and/or job description. Typically, the user's job role must be translated into SAP transaction codes with associated authorization codes comprising SAP software terminology so that the SAP software 6 may provide the security authorizations. SAP software terminology is very complex and a highly skilled person (e.g., a computer programmer) is required to translate the user's job role into SAP transaction codes with associated authorization codes. Therefore, the SAP server/database 4 additionally comprises a software tool suite 7 comprising a simple set of software tools to allow a person (e.g., a manager, a business owner, a security administrator, etc.) with very little technical knowledge regarding SAP software programming to create and modify a user profile based on a user's job role. The person using the software tool suite 7 to create and modify the user profile is herein referred to as a security administrator. The software tool suite 7 provides an interface to the SAP software 6. The software tool suite 7 provides the security administrator with two options. The first option is a maintenance option (example described in the flowchart of FIG. 2). The maintenance option provides the security administrator with shortcuts to the standard SAP transaction codes with associated authorization codes available with the standard SAP software 6. The second option is an analysis option (example described in the flowchart of FIG. 3). The analysis option converts complicated SAP transaction codes with associated authorization codes into simplified reports (i.e., user profile) that may be modified (i.e., customized) to a users job role and requirements to perform his/her job. Customizing the reports may include the addition of new custom transaction codes with associated authorization codes that are executable within the SAP software 6. The new custom transaction codes with associated authorization codes are locally developed and are not available with the standard SAP software 6. The software tool suite is adapted to check the reports in real time for potential security and/or conflict issues to ensure that user access is in compliance with a security policy of the business. The user profile will be executed in the SAP server/database to determine an access level (e.g., access to the specified applications) into the computer system 2 based on a security policy of the business. The software tool suite comprises security and authorization software to ensure user access to the specified applications is in compliance with the security policy of the business. To access the software tool suite the security administrator enters the custom transaction code ZSNA at any of terminals 8. The transaction code ZSNA displays a menu that serves as a gateway to the entire software tool suite. The menu provides access to both the maintenance option and the analysis option.

Figure 2:
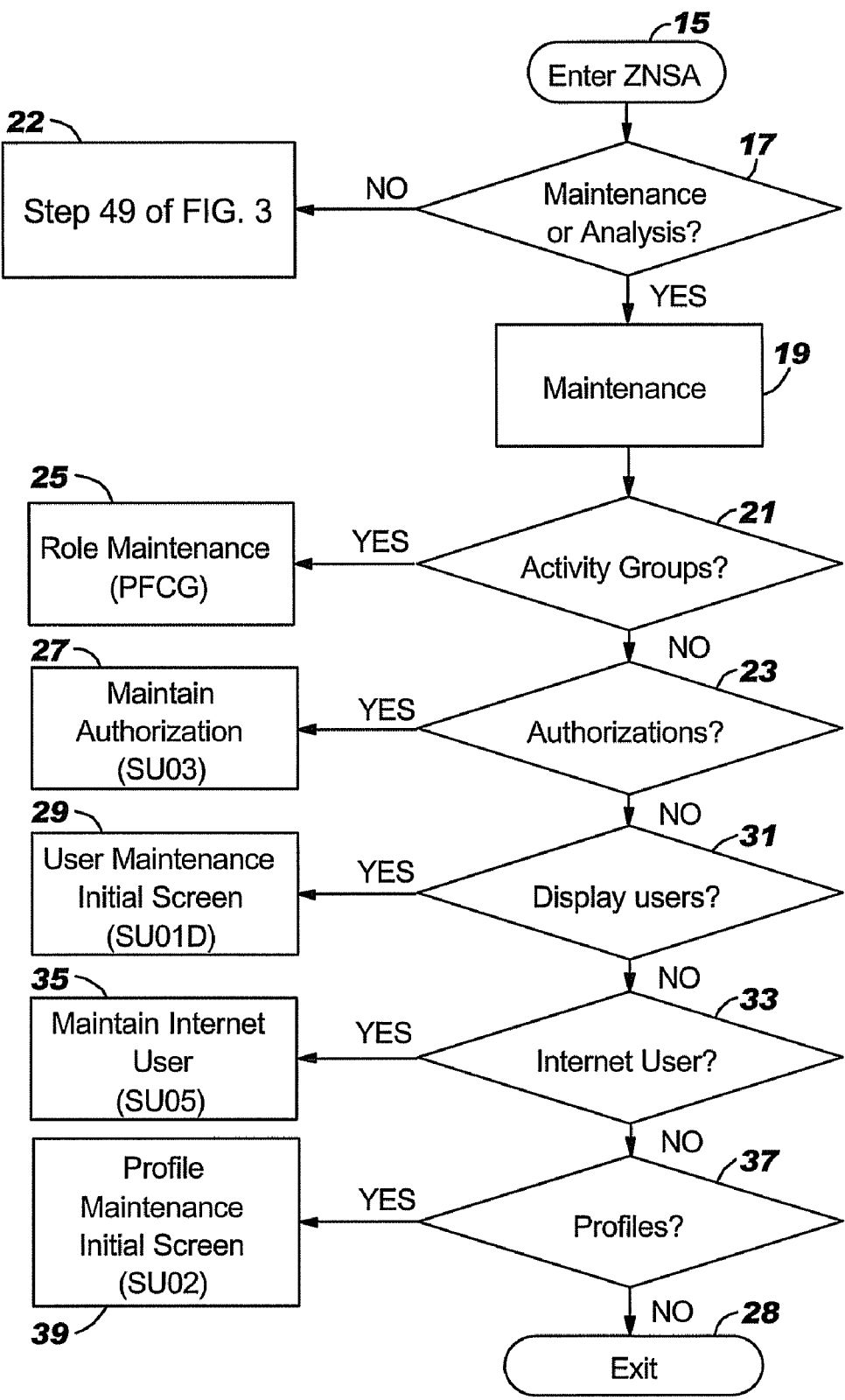
FIG. 2 is a flowchart describing the maintenance option of the software tool suite of FIG. 1, in accordance with embodiments of the present invention.

FIG. 2 is a flowchart showing an algorithm 22 describing the maintenance option of the software tool suite 7 comprised by the computer system 2 of FIG. 1, in accordance with embodiments of the present invention. Providing user access to the various applications necessary for the user (e.g., employee of the business) to perform his/her job duties requires accessing standard SAP transaction codes with associated authorization codes available with the standard SAP software so that a user profile may be modified to accommodate any changes in job duties. Accessing the standard SAP transaction codes with associated authorization codes within the SAP server/database 4 of FIG. 1 requires a complicated series of functions (e.g., sorting through multiple levels of code, sorting through multiple screens on a monitor, etc.) to be performed. The maintenance option provides shortcuts to standard SAP transaction codes with associated authorization codes available with the standard SAP software without requiring a complicated series of functions to be performed. In step 15, the security administrator enters ZSNA at any of terminals 8 of FIG. 1 to access the software tool suite 7. In Step 17, the security administrator is given a choice between the maintenance option and the analysis option. If the maintenance option is not selected in step 17, then go to step 49 of FIG. 3 in step 22 of FIG. 2. If the maintenance option is selected in step 17 then go to step 19. Steps 21, 23, 31, 33, and 37 provide the security administrator with options to select shortcuts to groups of standard SAP delivered security authorization/transaction codes (i.e., a standard set of transaction codes with associated authorization codes that typically come delivered with a SAP software package). In step 21, an activity group option is given. An activity group is a SAP grouping of access requirements for generating a user profile. If the activity option is selected in step 21, then a shortcut is established in step 25 to the role maintenance group (PFCG) of standard SAP delivered transaction codes with associated authorization codes so that the security administrator may generate a user profile. If the activity option is not selected in step 21, then an authorization option is given in step 23. If the authorization option is selected in step 23, then a shortcut is established in step 27 to the maintain authorization group (SU03) of standard SAP delivered security transaction codes with associated authorization codes so that the security administrator may maintain user authorization. If the authorization option is not selected in step 23, then a display users option is given in step 31. If the display users option is selected in step 31, then a shortcut is established in step 29 to the user maintenance initial screen group (SU01D) of standard SAP delivered transaction codes with associated authorization codes so that the security administrator may view user profiles. If the display users option is not selected in step 31, then an internet user option is given in step 33. If the internet user option is selected in step 33, then a shortcut is established in step 35 to the maintain internet user group (SU05) of standard SAP delivered transaction codes with associated authorization codes so that the security administrator may maintain user internet access. If the internet user option is not selected in step 33, then a profile option is given in step 37. If the profile option is selected in step 37, then a shortcut is established in step 39 to the profile maintenance initial screen group (SU02) of standard SAP delivered transaction codes with associated authorization codes so that the security administrator may maintain the user profile. Upon completion of the aforementioned sequence of steps, the computer system 2 exits from the maintenance option of the software tool suite 7 in step 28. Note that the specific sequence of steps 21, 23, 31, 33, and 37 in FIG. 3 is shown for illustration purposes and that any of steps 21, 23, 31, 33, and 37 may be performed in any sequence.

Figure 3:
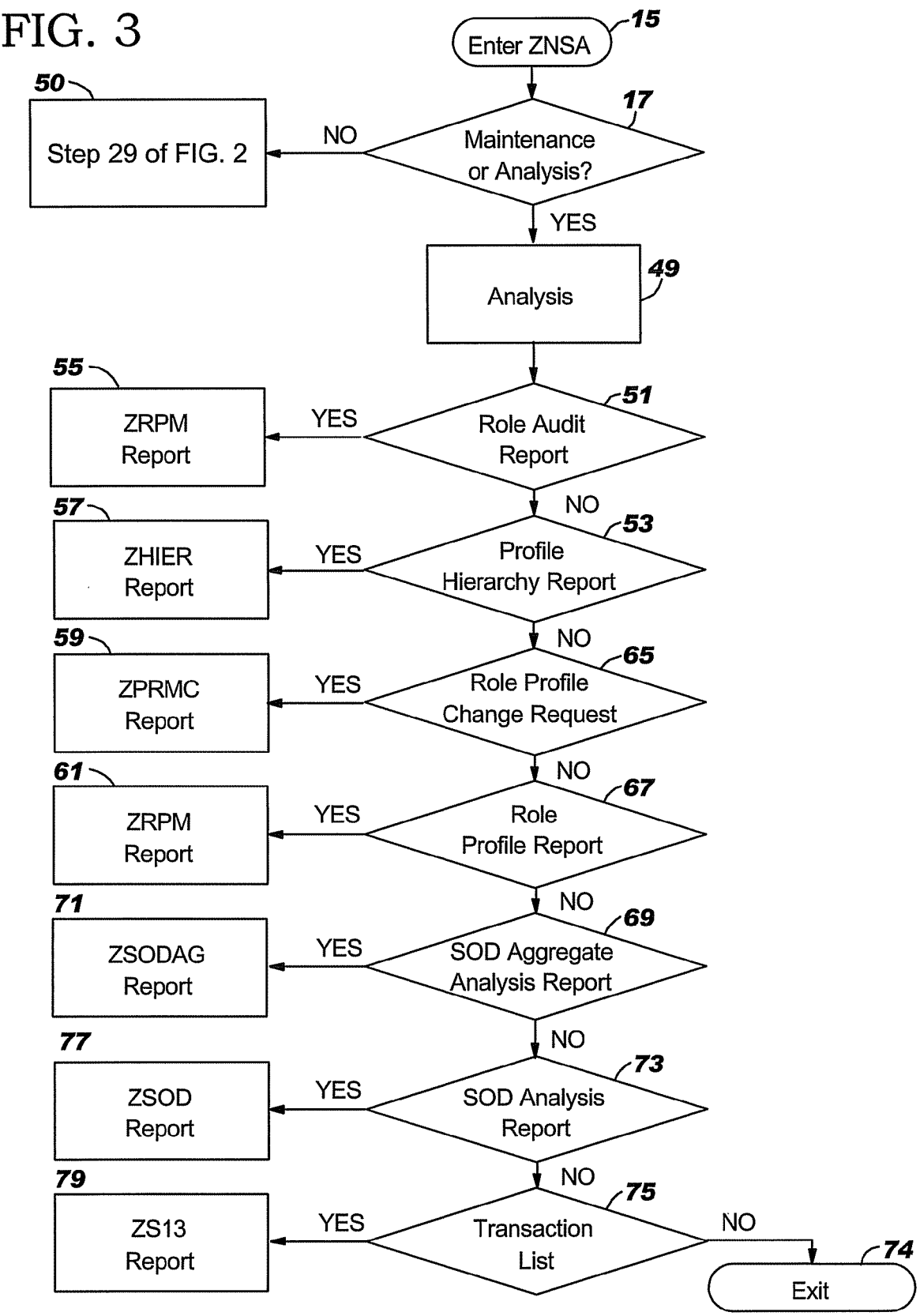
FIG. 3 is a flowchart describing the analysis option of the software tool of FIG. 1, in accordance with embodiments of the present invention.

FIG. 3 is a flowchart showing an algorithm 22 describing the analysis option of the software tool suite comprised by the computer system 2 of FIG. 1, in accordance with embodiments of the present invention. The analysis option converts complicated SAP transaction codes with associated authorization codes into simplified reports that may be customized to a users job role and requirements to perform his/her job. Customizing the reports may include the addition of new custom transaction codes with associated authorization codes that are executable within the SAP software 6. The new custom transaction codes with associated authorization codes are locally developed and are not available with the standard SAP software 6. The software tool suite is adapted to check the reports in real time for potential security and/or conflict issues to ensure that user access is in compliance with a security policy of the business. In step 15, the security administrator enters ZSNA at any of terminals 8 to access the software tool suite 7. In step 17, the security administrator is given a choice between the maintenance option and the analysis option. If the analysis option is not selected in step 17, then go to step 19 of FIG. 2 in step 50 of FIG. 3. If the analysis option is selected in step 17 then go to step 49. In step 49, the analysis option is selected. Steps 51, 53, 65, 67, 69, 73, and 75 provide the security administrator with options to select shortcuts to the custom reports comprising the custom transaction codes with associated authorization codes. In step 21, a role audit report option is given. If the role audit report is selected in step 51, then the custom role audit report ZAUDIT is generated in step 55. The custom role audit report ZAUDIT audits (i.e., report/review) the user profile for any unacceptable transaction codes with associated authorization codes. If the role audit report is not selected in step 51, then a profile hierarchy report option is given in step 53. If the profile hierarchy report option is selected in step 53, then the custom profile hierarchy report ZHIER is generated in step 57. The custom profile hierarchy ZHIER reports/reviews the user profile for hierarchy values contained for other sites (i.e., other business locations). If the profile hierarchy report ZHIER is not selected in step 53, then a role profile change request report option is given in step 65. If the role profile change request report option is selected in step 65, then the custom role profile change request report ZRPMC is generated in step 59. The custom role profile change request report ZRPMC is used to specify transaction codes with associated authorization codes to be added and/or changed for a user profile. The custom role profile change request report ZRPMC is used by the security administrator to specify the transaction code with associated authorization code restrictions for a user profile. The security administrator runs ZRPMC when a user profile needs to be created or changed. The report created by ZRPMC is updated by the software tool suite 7 and this report provides the specifications needed to build or change the user profile. If the custom role profile change request report ZRPMC is not selected in step 65, then a role profile report option is given in step 67. If the role profile report option is selected in step 67, then the custom role profile report ZRPM is generated in step 61. The custom role profile report ZRPM is a final report in user friendly terms of all of the transaction codes with associated authorization codes for the associated user profile. If the custom role profile report ZRPM is not selected in step 67, then a separation of duties (SOD) aggregate analysis report option is given in step 69. If the SOD aggregate analysis report option is selected in step 69, then the custom SOD aggregate analysis report ZSODAG is generated in step 71. The custom SOD aggregate analysis report ZSODAG checks for any separation of duties conflicts between a plurality of user profiles. If the custom SOD aggregate analysis report ZSODAG is not selected in step 69, then an SOD analysis report option is given in step 73. If the SOD analysis report option is selected in step 73, then the custom SOD analysis report ZSOD is generated in step 77. In contrast with the custom SOD aggregate analysis report ZSODAG, the custom SOD analysis report ZSOD checks for any separation of duties conflicts for one user profile. If the custom SOD analysis report ZSOD is not selected in step 73, then a transaction report option is given in step 75. If the transaction report option is selected in step 75, then the custom transaction report ZS13 is generated in step 79. The custom transaction report ZS13 is a list of all transaction codes and associated descriptions for the user profile. Upon completion of the aforementioned sequence of steps, the computer system 2 exits from the analysis option of the software tool suite 7 in step 74. Note that the specific sequence of steps 51, 53, 65, 67, 69, 73, and 75 in FIG. 4 is shown for illustration purposes and that any of steps 51, 53, 65, 67, 69, 73, and 75 may be performed in any sequence.

Figure 4:
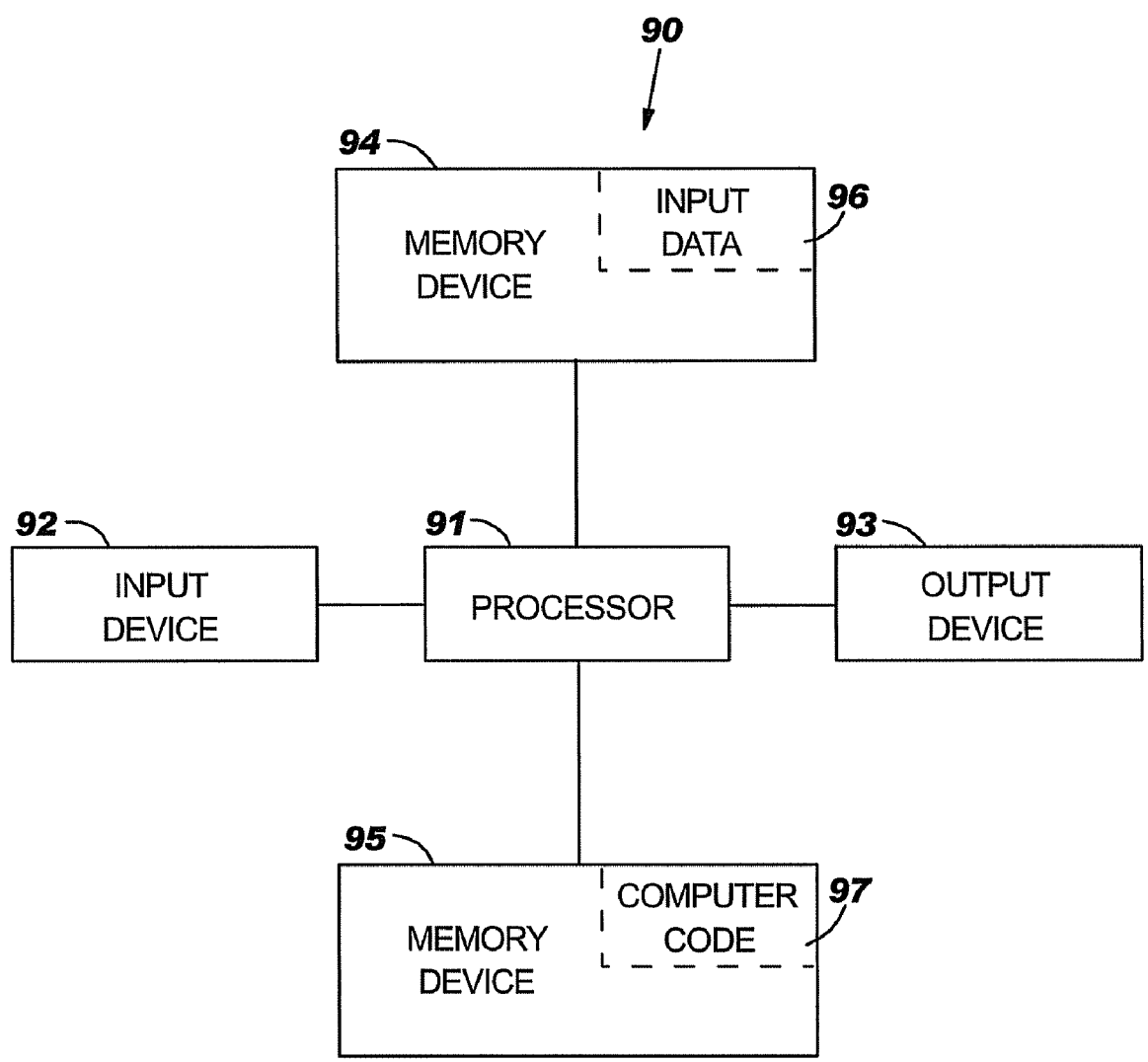
FIG. 4 illustrates a computer system used for creating and customizing the user profile of FIGS. 1-3, in accordance with embodiments of the present invention.

FIG. 4 illustrates a computer system 90 used for creating and customizing the user profile of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm(s) for creating and modifying the user profile of the present invention. The processor 91 executes the computer code 97. The memory device 94 includes input data 96. The memory device 94 memory device 95, and the processor 91 may relate to the SAP server/database 4 of FIG. 1. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices. As another example, the hardware and software environments of FIGS. 1-3, discussed supra, may be utilized.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer system comprising a computer processor and a non-transitory computer readable memory unit coupled to the processor, said memory unit containing systems applications and products (SAP) security software and a software tool suite that when executed by the computer processor implement a method comprising the computer implemented steps of:
creating by the computer processor executing the software tool suite, a user profile for a user, wherein the user profile comprises at least one transaction necessary for the user to access at least one specified application;
converting, by the software tool suite, the user profile into SAP terminology;
creating by the software tool suite, a user profile report in real time to verify that the user profile is in compliance with a security standard of the computer system; and
integrating in real time by the software tool suite, the user profile into the SAP security software.

2. The computing system of claim 1, wherein the user profile additionally comprises at least one authorization necessary for access to the at least one specified application.

3. The computing system of claim 2, wherein the software tool suite is adapted to perform an analysis on the user profile.

4. The computing system of claim 3, wherein the software tool comprises an audit tool adapted to detect a presence of unauthorized activities in the profile.

5. The computing system of claim 1, wherein the at least one specified application is selected from the group consisting of a computer program and a data file.

6. The computing system of claim 1, wherein the security software is further adapted to authorize the user to execute a specified function within the at least one specified application.

7. The computing system of claim 1, wherein the software tool suite is adapted to perform maintenance on the user profile.

8. A computer program product, comprising a non-transitory computer readable storage medium having a computer readable program code stored therein, said computer readable program code containing security software, a software tool suite, and instructions configured to be executed by a computer processor of a computer system to implement a method comprising the steps of:
creating by the computer processor executing the software tool suite, a user profile for a user, wherein the user profile comprises at least one transaction necessary for the user to access at least one specified application, and wherein the user profile further comprises authorizations necessary for access to the at least one specified application;
creating by the software tool suite, a user profile report in real time to verify that the user profile is in compliance with a security standard of a computer system comprising the software system;
integrating in real time by the software tool suite, the user profile into the security software;
authorizing by the security software, the user to access at least one specified application on the computer system based on the user profile; and
performing by the software tool suite, an analysis on the user profile, wherein the software tool suite comprises a separation of duties tool for performing the analysis on the user profile, and wherein the analysis comprises detecting by the separation of duties tool, a presence of conflicting job activities within the user profile.

9. A computer system comprising a computer processor and a non-transitory computer readable memory unit coupled to the processor, said memory unit containing security software and a software tool suite that when executed by the computer processor implement a method comprising the computer implemented steps of:
creating by the software tool suite, a user profile for a user, wherein the user profile comprises at least one transaction necessary for the user to access at least one specified application, and wherein the user profile further comprises authorizations necessary for access to the at least one specified application;
creating by the software tool suite, a user profile report in real time to verify that the user profile is in compliance with a security standard of a computer system comprising the software system;
integrating in real time by the software tool suite, the user profile into the security software;
authorizing by said computer processor, the user to access at least one specified application on the computer system based on the user profile, said security software executed by said computer processor; and
performing by the software tool suite, an analysis on the user profile, wherein the software tool suite comprises a role/profile matrix tool for performing the analysis on the user profile, and wherein the analysis comprises displaying by the role/profile matrix tool, the user profile in a specified business format.

10. A computer system comprising a computer processor and a non-transitory computer readable memory unit coupled to the processor, said memory unit containing security software and a software tool suite that when executed by the computer processor implement a method comprising the computer implemented steps of:
creating by the computer processor executing the software tool suite, a user profile for a user, wherein the user profile comprises at least one transaction necessary for the user to access at least one specified application, and wherein the user profile further comprises authorizations necessary for access to the at least one specified application;
creating by the software tool suite, a user profile report in real time to verify that the user profile is in compliance with a security standard of a computer system comprising the software system;
integrating in real time by the software tool suite, the user profile into the security software;
authorizing by the security software, the user to access at least one specified application on the computer system based on the user profile; and
performing by the software tool suite, an analysis on the user profile, wherein the software tool suite comprises a separation of duties tool for performing the analysis on the user profile, and wherein the analysis comprises detecting by the separation of duties tool, a presence of conflicting job activities within the user profile.

11. The computing system of claim 10, wherein said method further comprises:
   providing within the software tool suite a role/profile matrix tool for performing the analysis on the user profile, wherein the analysis comprises:
   displaying by the role/profile matrix tool, the user profile in a specified business format.

12. A computer program product, comprising a non-transitory computer readable storage medium having a computer readable program code stored therein, said computer readable program code containing security software, a software tool suite, and instructions configured to be executed by a computer processor of a computer system to implement a method comprising the steps of:
   creating by the software tool suite, a user profile for a user, wherein the user profile comprises at least one transaction necessary for the user to access at least one specified application, and wherein the user profile further comprises authorizations necessary for access to the at least one specified application;
   creating by the software tool suite, a user profile report in real time to verify that the user profile is in compliance with a security standard of a computer system comprising the software system;
   integrating in real time by the software tool suite, the user profile into the security software;
   authorizing by said computer processor, the user to access at least one specified application on the computer system based on the user profile, said security software executed by said computer processor; and
   performing by the software tool suite, an analysis on the user profile, wherein the software tool suite comprises a role/profile matrix tool for performing the analysis on the user profile, and wherein the analysis comprises displaying by the role/profile matrix tool, the user profile in a specified business format.

13. The computer program product of claim 12, wherein said method further comprises:
   providing within the software tool suite an audit tool for performing the analysis on the user profile, wherein the analysis comprises:
   detecting by the audit tool, a presence of unauthorized activities in the user profile.

14. The computer program product of claim 12, wherein said method further comprises:
   providing within the software tool suite a separation of duties tool for performing the analysis on the user profile, wherein the analysis comprises:
   detecting by the separation of duties tool, a presence of conflicting job activities within the user profile.

* * * * *